United States Patent [19]
MacKenzie

[11] Patent Number: 5,992,580
[45] Date of Patent: Nov. 30, 1999

[54] REVERSIBLE BRAKING MECHANISM

[75] Inventor: Donald Angus MacKenzie, Aberdeen, United Kingdom

[73] Assignee: Deveron Tackle Limited, Aberdeenshire, United Kingdom

[21] Appl. No.: 08/972,615

[22] Filed: Nov. 18, 1997

Related U.S. Application Data

[63] Continuation-in-part of application No. 08/634,874, Apr. 19, 1996, abandoned.

[30] Foreign Application Priority Data

Apr. 21, 1995 [GB] United Kingdom ................. 95081030

[51] Int. Cl.$^6$ ..................................................... F16D 41/06
[52] U.S. Cl. ..................................... 188/82.34; 242/396.9
[58] Field of Search .................................. 188/82.3, 82.2, 188/82.37, 82.1; 192/44, 42, 48.92, 51; 242/396.5, 396.9

[56] References Cited

U.S. PATENT DOCUMENTS 2,734,693  2/1956  Rabezzana ........................ 188/82.34
4,766,772  8/1988  Tsuchie ............................. 192/48.92
5,109,964  5/1992  Fukui et al. .......................... 192/47

FOREIGN PATENT DOCUMENTS 4307128  10/1992  Japan ................................. 192/48.92
 781973   8/1957  United Kingdom .
1303785   1/1973  United Kingdom .

*Primary Examiner*—Matthew C. Graham
*Attorney, Agent, or Firm*—Ratner & Prestia

[57] ABSTRACT

A reversible braking mechanism is described, wherein a female member (5) receives a male member (3). One member (3, 5) carries a pair of bushes (19, 31) and the other member (3, 5) carries a pair of uni-directional roller bearings (21, 39) which engage the pair of bushes (19, 31). The uni-directional roller bearings (21, 39) are arranged in opposing directions, and a bush braking device (17) is selectively engageable with either of the bushes (19, 31).

10 Claims, 2 Drawing Sheets

REVERSIBLE BRAKING MECHANISM

This is a continuation-in-part application of Ser. No. 08/634,874, filed Apr. 19, 1996, now abandoned. This invention relates to a reversible braking mechanism between two members, preferably but not exclusively, for use in a fly fishing reel.

BACKGROUND OF THE INVENTION

Fly fishing reels require a spool that rotates freely whilst the fishing line is wound onto the spool, and that provides a braking means whilst the fishing line is withdrawing from the spool. As there are, of course, left and right handed anglers, this feature has to be reversible.

Traditionally, this mechanism has been achieved in a number of ways, but principally by utilising a series of springs with pawls engaging a gear on the back of the spool, or by using a sprag clutch or freewheel. However, using these traditional methods, it is necessary to dismantle the braking mechanism, remove and then change over either pawls or freewheels, in order to accommodate either the left or right handed angler.

SUMMARY OF THE INVENTION

The present invention provides a reversible braking mechanism comprising a male member and a female member in which the male member is capable of being received, one of said members carrying a pair of bushes, the other of said members carrying a pair of unidirectional bearings arranged for movement in opposing directions, where the pair of uni-directional bearings engage the pair of bushes when the female member receives the male member, and a bush braking device selectively engageable with either of the bushes, wherein the male member is capable of being withdrawn from the female member such that the pair of bushes are retained on the respective one member and the pair of uni-directional bearings are retained on the respective other member.

The invention has the advantage that it is reversible with no need for dismantling the apparatus and that it provides a braking system in either rotational direction. Another advantage is that the level of braking is controllable.

Preferably, said one member is the male member and said other member is the female member.

Typically the bush braking device is controlled by means of a screw thread centred on the longitudinal axis of the male member, that co-operates with the bush braking device.

Preferably the bush braking device may be applied against either bush or may be positioned so that neither bush is braked.

Preferably the uni-directional bearings are unidirectional roller bearings.

Preferably the bush braking device is controlled by an external knob, and most preferably, rotating the knob in one direction brakes one bush and rotating it in the other direction brakes the other bush.

Preferably the braking mechanism is incorporated in a fly reel in which the female member forms the hub of a spool, and in which the male member forms a spindle projecting from a flange, the flange being transverse to the longitudinal axis of the spindle. The fly reel typically incorporates an attachment means, for connection to a conventional fishing rod, on a cage extending from the flange around the spool.

Preferably, the fly reel has a cog on the female member that may engage with a ratchet clip on the male member, which may be engaged or disengaged. More preferably, the ratchet clip features a biassing means that acts on the ratchet clip in a direction transverse to the longitudinal axis of the hub and spindle.

BRIEF DESCRIPTION OF THE DRAWINGS

Embodiment of the invention will now be described, by way of example, with reference to the accompanying drawings, in which.

DESCRIPTION OF PREFERRED EMBODIMENTS

Figure 1:
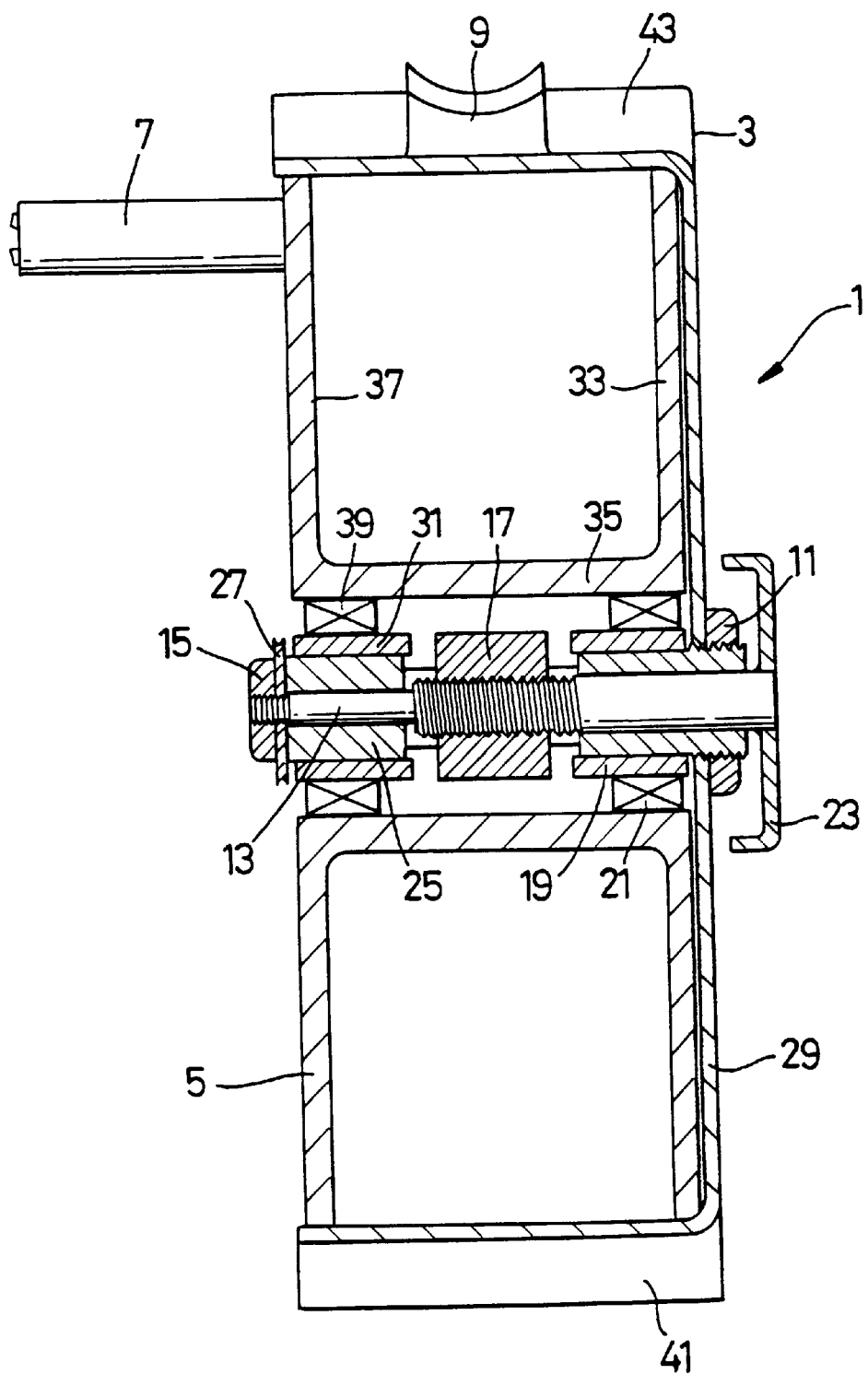
FIG. 1 is a cross sectional view of a fly reel incorporating a reversible braking mechanism in accordance with the invention.

With reference to FIG. 1, a body 3 is combined with a spool 5, to provide a fly reel 1.

The spool 5 incorporates a female member in the form of a central hub 35, which includes an inner bore. A first disc face 33 is connected to one end of the central hub 35, and a second disc face 37 is connected to the other end, with both discs being transverse to the axial direction of the central hub 35. Fishing line (not shown) is wound onto the hub 35.

The body 3 has a male member in the form of a centre spindle 25 which projects from a disc face 29. The disc face 29 is transverse to the longitudinal axis of the centre spindle 25. The body 3 has a cage 41 that projects from the circumference of the disc face 29, in the same direction as the centre spindle 25. The cage 41 has several limbs (not all shown), the furthest ends from the disc face being connected by a ring (not shown). When the spool 5 is engaged with the body 3, said ring lies in a groove cut into second disc face 37. A rod connection means 9 is provided on a limb 43, for attachment of the fly reel 1 to a conventional fishing rod (not shown).

A winding handle 7 is positioned on the spool 5 and is free to rotate in either direction.

A central screw 13 is located within the centre spindle 25, and is held in place by a brake knob 23 at one end, and by a locking nut 15 at the other end. The central screw 13 passes through the centre spindle 25, and through a spacer 27 mounted at the respective other end of the centre spindle 25, with no contact, but cooperates with right hand threaded brake 17 by means of a corresponding right hand thread. Preferably, the locking nut 15 and the respective other end of the central screw 13 have corresponding left hand threads. Accordingly, when the central screw 13 is rotated by means of rotation of the brake knob 23, there is axial travel of movement of the threaded brake 17, with no axial travel of movement of the central screw 13.

The centre spindle 25 is attached to the body 3 by nut 11. A first bush 19 is located, and retained, on the centre spindle 25 adjacent to the disc face 29. The threaded brake 17 is slotted into a keyhole in the centre of the centre spindle 25. One side of the threaded brake 17 is thus adjacent to the first bush 19. A second bush 31 is located adjacent to the other side of the threaded brake 17. The second bush 31 is kept in place, and retained, on the centre spindle 25 by means of the threaded spacer 27.

Thus, the first bush 19 and the second bush 31 are free to rotate in either direction when the threaded brake 17 is not in contact with either the first bush 19 or the second bush 31. Rotating brake knob 23 in the required direction moves the threaded brake 17 into contact with the appropriate bush 19, 31. Friction is hence produced between the threaded brake 17 and the corresponding bush 19, 31 and so a controllable braking action is provided. Therefore, continued rotation of brake knob 23 increases the friction produced between the threaded brake 17 and the corresponding bush 19, 31.

Optionally, two brass washers (not shown) spaced apart by a washer (not shown) formed from a composite material, such as polyurethane, can be located at both sides of the threaded brake 17 in the space between the respective first 19 and second 31 bushes. This provides the advantage that the degree of the braking produced by the friction between the threaded brake 17 and the respective bushes 19, 31 is less marked, and thus more controllable.

Secured to the inner bore of one end of the central hub 35 is a first uni-directional roller bearing 21 (such as, for example, a "one way needle roller clutch", manufactured by the INA Bearing Company) that cooperates directly with the first bush 19 when the centre spindle 25 is received within the central hub 35. Secured to the inner bore of the other end of the central hub 35 is a second uni-directional roller bearing 39 that co-operates directly with the second bush 31 when the centre spindle 25 is received within the central hub 35.

The first 21 and second 39 uni-directional roller bearings are, however, arranged for movement in opposing directions.

Therefore, rotating brake knob 23 in the desired direction applies a braking force to either the first bush 19 or the second bush 31, by means of the threaded brake 17. Thus, when the centre spindle 25 is received within the central hub 35, the spool 5 will then only rotate freely in one direction, due to either the first uni-directional roller bearing 21 or the second uni-directional roller bearing 39 resisting rotation in the braked direction. The direction of rotation required to be braked can easily be reversed by rotating the brake knob 23 in the appropriate direction.

Thus, the fly reel 1 is suitable for either a left handed or a right handed person.

The centre spindle 25 can be withdrawn from the inner bore of the central hub 35, simply by pulling the body 3 away from the spool 5 in the axial direction of the centre spindle 25, and the first 21 and second 39 uni-directional roller bearings are thus retained on the spool 5, and the first 19 and second 31 bushes are retained on the centre spindle 25. This feature provides the advantage that a number of spools 5 carrying different types of fishing line can be easily interchanged with the body 3.

Figure 2:
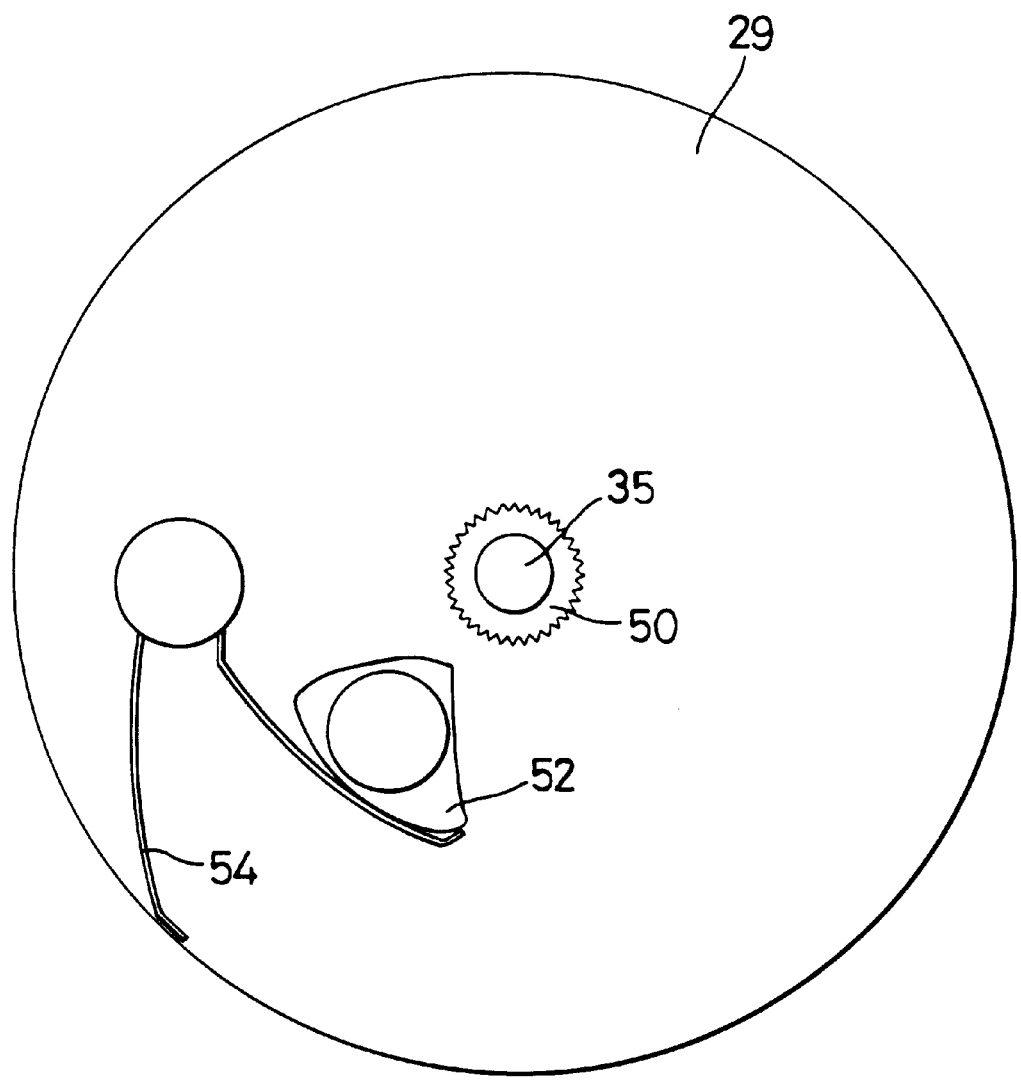
FIG. 2 is a plan view of a ratchet clip mechanism mounted on the fly reel of FIG. 1.

With reference to FIG. 2, a cogwheel 50 is located on the respective one end of the central hub 35 of the spool 5 (not shown in FIG. 2), where the cogwheel 50 may co-operate with a biassed clip 52 located on the disc face 29. The biassed clip 52 is selectively engageable with the cog wheel 50 and thus, when the spool 5 moves relative to the body 3, a clicking noise is produced which is familiar to people who use traditional fishing reels. The clip 52 is biassed by a spring 54. The clip 52 is engaged with the cogwheel 50 by releasing the clip 52 from the action of the spring 54, and rotating the clip 52 by 120°, so that a lengthened portion of the clip 52 is engageable with the cogwheel 50. The clip 52 is then biassed by the spring 54 to produce the clicking noise upon rotation of the spool 5 relative to the body 3.

Ser. No. 08/634,874, filed Apr. 19, 1996 is incorporated herein by reference and any improvements and modifications may be incorporated without departing from the scope of the present invention.

I claim:

1. A fishing reel capable of storing fishing line, the fishing reel comprising a male member and a female member in which the male member is capable of being received, one of said members carrying a pair of bushes, the other of said members carrying a pair of uni-directional bearings arranged for movement in opposing directions, where the pair or uni-directional bearings engage the pair of bushes when the female member receives the male member, and a bush braking device selectively engageable with either of the bushes by means of movement therebetween in a selected direction, wherein the male member is capable of being withdrawn from the female member such that the pairs of bushes are retained on the respective one member and the pair of uni-directional bearings are retained on the respective other member, wherein engagement between the bush braking device and the selected bush produces a braking force between the bush braking device and the selected bush due to friction created therebetween, and continued movement in the selected direction between the bush braking device and the selected bush increases the level of friction created therebetween thereby increasing the braking force.

2. A fishing reel according to claim 1, wherein said one member is the male member and said other member is the female member.

3. A fishing reel according to claim 1, wherein the bush braking device is controlled by means of a screw thread centred on the longitudinal axis of the male members that co-operates with the bush braking device.

4. A fishing reel according to claim 1, wherein the bush braking device may be applied against either bush or may be positioned so that neither bush is braked.

5. A fishing reel according to claim 1, wherein the uni-directional bearings are uni-directional roller bearings.

6. A fishing reel according to claim 1, wherein the bush braking device is controlled by an external knob, and rotating the knob in one direction brakes one bush and rotating it in the other direction brakes the other bush.

7. A fishing reel according to claim 1 wherein the female member comprises a hub and a first disc face, the hub projecting from the first disc face, the first disc face being transverse to the longitudinal axis of the hub; and the male member comprises a spindle and a second disc face, the spindle projecting from the second disc face and the second disc face being transverse to the longitudinal axis of the spindle.

8. A fishing reel according to claim 7, wherein the reel has a cog on the female member that is engageable with a ratchet clip on the male member, where the ratchet clip is capable of being engaged with, or disengaged from, the cog.

9. A fishing reel according to claim 8, wherein a biassing means which biasses the ratchet clip in a direction transverse to the longitudinal axis of the hub and the spindle.

10. A fishing reel according to claim 7, wherein the fishing reel includes a cage extending from one of the disc faces, the cage incorporating an attachment device for connection to a fishing rod.

* * * * *

UNITED STATES PATENT AND TRADE MARK OFFICE
CERTIFICATE OF CORRECTION

PATENT NO. : 5,992,580
DATED : November 30, 1999
INVENTOR(S) : MacKenzie

It is certified that error appears in the above-identified patent and that said Letters Patent is hereby corrected as shown below:

Col 4, Line 17: should read:
--withdrawn from the female member such that the pair of--

Signed and Sealed this

Seventh Day of November, 2000

Attest:

Q. TODD DICKINSON

*Attesting Officer*                    *Director of Patents and Trademarks*